United States Patent
Yuasa

(10) Patent No.: US 8,982,583 B2
(45) Date of Patent: Mar. 17, 2015

(54) ELECTRICAL APPARATUS

(75) Inventor: Hiroaki Yuasa, Toyota (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 0 days.

(21) Appl. No.: 13/882,551

(22) PCT Filed: Nov. 26, 2010

(86) PCT No.: PCT/JP2010/071120
§ 371 (c)(1),
(2), (4) Date: Apr. 30, 2013

(87) PCT Pub. No.: WO2012/070146
PCT Pub. Date: May 31, 2012

(65) Prior Publication Data
US 2013/0229741 A1    Sep. 5, 2013

(51) Int. Cl.
*H05K 7/00* (2006.01)
*H01H 9/02* (2006.01)
*H01H 19/04* (2006.01)
*H02H 1/00* (2006.01)
*H02H 5/04* (2006.01)
*H01H 85/24* (2006.01)
*H01H 85/00* (2006.01)

(52) U.S. Cl.
CPC ............. *H02H 1/0038* (2013.01); *H02H 5/04* (2013.01); *H01H 85/24* (2013.01); *H01H 85/0026* (2013.01)
USPC ................................. 361/837; 174/58; 174/50

(58) Field of Classification Search
CPC ........ H02G 3/16; H02H 1/0038; H02H 85/24
USPC ............... 174/522, 50, 58, 60; 361/837
See application file for complete search history.

(56) References Cited

U.S. PATENT DOCUMENTS

| | | | | |
|---|---|---|---|---|
| 1,469,439 | A * | 10/1923 | Liversidge | 337/201 |
| 5,990,439 | A * | 11/1999 | Pever | 218/156 |
| 6,540,543 | B1 * | 4/2003 | Watanabe | 439/354 |
| 6,848,946 | B2 * | 2/2005 | De Faria et al. | 439/620.29 |
| 2004/0007373 | A1 | 1/2004 | Higuchi et al. | |
| 2007/0293091 | A1 * | 12/2007 | Korczynski | 439/620.26 |
| 2008/0242150 | A1 | 10/2008 | Chikamatsu et al. | |
| 2009/0033453 | A1 | 2/2009 | Deno et al. | |

FOREIGN PATENT DOCUMENTS

| | | |
|---|---|---|
| JP | 2-041881 A | 11/1990 |
| JP | 5-11421 U | 2/1993 |
| JP | 6-327121 A | 11/1994 |

(Continued)

*Primary Examiner* — Jinhee Lee
*Assistant Examiner* — Abhishek Rathod
(74) *Attorney, Agent, or Firm* — Kenyon & Kenyon LLP

(57) ABSTRACT

An electrical apparatus that can prevent erroneous attachment of a fuse is provided. A PCU includes a housing having a surface. A fuse storage space is formed in the housing. The fuse storage space communicates with a region outside of the housing through an opening formed at the surface. The PCU further includes a cover member covering the opening, and an overcurrent-protection fuse located in the fuse storage space. The cover member includes a cover body closing the opening, and a projection section projecting inward of the fuse storage space relative to the cover body. The projection section interferes with the fuse when the fuse is attached erroneously in the fuse storage space.

4 Claims, 4 Drawing Sheets

(56) References Cited

FOREIGN PATENT DOCUMENTS

| | | | |
|---|---|---|---|
| JP | 9-148753 | A | 6/1997 |
| JP | 2004-048858 | A | 2/2004 |
| JP | 2005-153827 | A | 6/2005 |
| JP | 2007-314026 | A | 12/2007 |

* cited by examiner

ELECTRICAL APPARATUS

This is a 371 national phase application of PCT/JP2010/071120 filed 26 Nov. 2010, the contents of which are incorporated herein by reference.

TECHNICAL FIELD

The present invention relates to electric apparatuses, particularly an electric apparatus including an overcurrent-protection fuse.

BACKGROUND ART

Conventionally, various approaches have been proposed in association with an electrical apparatus including a fuse. For example, Japanese Patent Laying-Open No. 2005-153827 (PTL 1) discloses a configuration of a power storage device for a vehicle, including a base plate coupled to a side face of a battery, and having a recess provided at the side face corresponding to the battery side, wherein a main switch and main fuse are positioned in the recess. Further, Japanese Patent Laying-Open No. 9-148753 (PTL 2) relates to a method for fabricating a housing for an electrical apparatus, having a recess formed to house a thermal fuse mounted on a printed circuit board, on the upper face of a fixed type projection, wherein the opening perimeter of the recess is in contact with the bottom face of the printed circuit board. Furthermore, Japanese Utility Model Laying-Open No. 5-11421 (PTL 3) discloses a transformer for an inverter, configured such that one end of a flange of the surface cover extends outward horizontally in contact to form a canopy section with a thermal fuse mounted at the upper portion of the canopy section.

In association with a drainage structure of an electrical component storage box, Japanese Patent Laying-Open No. 2004-48858 (PTL 4) discloses a configuration in which a drain port is provided at the bottom wall of the box, including a notch continuous with the drain port, and an inclination section at the outer side of the bottom wall, becoming thinner towards the perimeter of the drain port, wherein the inclination section is provided with a drainage groove.

CITATION LIST

Patent Literature

PTL 1: Japanese Patent Laying-Open No. 2005-153827
PTL 2: Japanese Patent Laying-Open No. 9-148753
PTL 3: Japanese Utility Model Laying-Open No. 5-11421
PTL 4: Japanese Patent Laying-Open No. 2004-48858

SUMMARY OF INVENTION

Technical Problem

In order to restart an electric circuit after a current exceeding the rating flows to the electric circuit to cause the fuse to blow out, the burned fuse must be exchanged. This fuse exchange is implemented by taking out the burned fuse from a storage space provided at the electrical apparatus for storing a fuse, and then attaching a new fuse at the storage space. At this stage, the new fuse may be erroneously attached upside down in the storage space.

In the case where a cover is provided at the fuse storage space, the space insulation distance between the cover and fuse may not be ensured if the fuse is assembled upside down, leading to the problem of short-circuiting.

In view of the foregoing problem, a main object of the present invention is to provide an electrical apparatus that can prevent erroneous attachment of a fuse.

Solution to Problem

An electrical apparatus according to the present invention includes a housing having a surface. The housing has a space formed inside. The space communicates with a region outside of the housing through an opening formed at the surface. The electrical apparatus further includes a cover member made of metal, covering the opening, and an overcurrent-protection fuse located in the space. The cover member includes a cover body closing the opening, a projection section protruding inward of the space relative to the cover body. When the fuse is attached properly in the space, the insulation distance between the cover member and the fuse is ensured. When the fuse is attached erroneously in the space, the projection section interferes with the fuse to disallow attachment of the cover member to the housing.

Preferably in the electric apparatus set forth above, the cover body and projection section are a unitary molding made of metal.

Preferably in the electrical apparatus set forth above, the cover body is formed plate-like, and the projection section is formed denting in a direction from the side of an outer face towards the side of an inner face of the cover body.

Preferably, in the electrical apparatus set forth above, the housing is arranged such that the surface has an inclination of a first angle with respect to a horizontal plane. The projection section has a dent bottom constituting a bottom face in a shape denting in the direction from the side of the outer face towards the side of the inner face of the cover body. The dent bottom joins the cover body at the lower side of the inclination of the housing, and is inclined having a second angle with respect to the cover body. The second angle is smaller than the first angle.

Advantageous Effects of Invention

According to an electrical apparatus of the present invention, erroneous attachment of a fuse to the electrical apparatus can be prevented.

DESCRIPTION OF EMBODIMENTS

Figure 1:
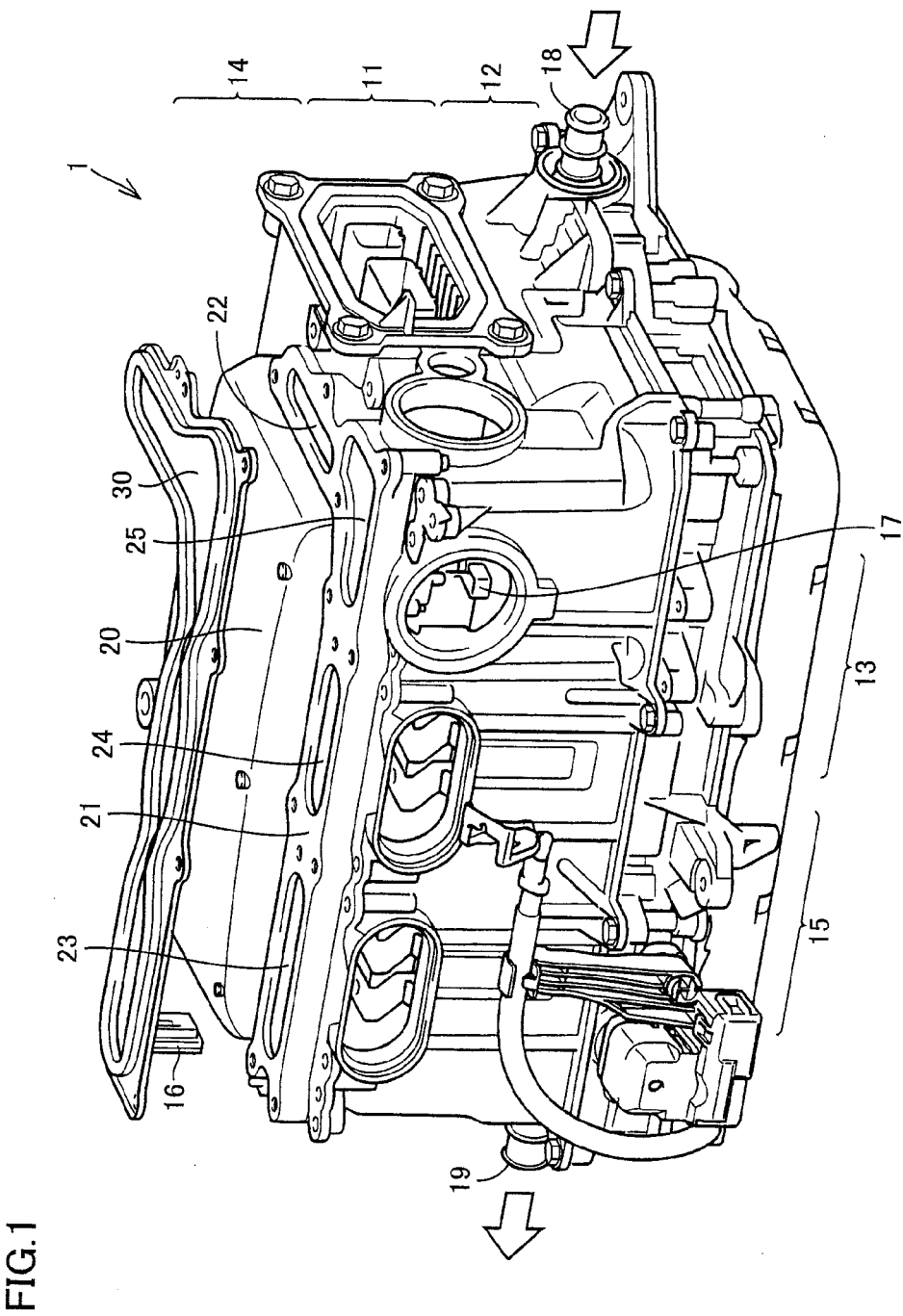
FIG. 1 is a perspective view showing an exemplified structure of an electrical apparatus according to an embodiment.

Embodiments of the present invention will be described hereinafter based on the drawings. In the drawings, the same or corresponding elements have the same reference characters allotted, and description thereof will not be repeated.

FIG. 1 is a perspective view of an exemplified structure of an electrical apparatus according to an embodiment. In FIG. 1, a PCU (Power Control Unit) 1 mounted on a vehicle is illustrated as an example of an electrical apparatus. PCU 1 includes, in a housing 20, a MG (Motor Generator)-ECU (Electronic Control Unit) 11, an inverter, a boost converter, and a DC (Direct Current)-DC converter 15 integrally. The inverter and boost converter are mainly constituted of an IPM (Intelligent Power Module) 12 for running and boosting, a reactor 13, and a capacitor 14.

MG-ECU 11 controls the inverter and boost converter according to output request values from the control device. The boost converter boosts the battery voltage to drive the motor generator at high voltage. The inverter converts the high-voltage DC current boosted by boost converter into AC current for supply to the motor generator. When the motor generator functions as a generator, the inverter converts the generated AC current into DC current. DC-DC converter 15 down-converts the battery voltage for supply to an auxiliary and/or auxiliary battery.

An opening 22 is formed at a surface 21 of housing 20. In housing 20, a fuse storage space 40 (not shown in FIG. 1) is formed for the purpose of storing a fuse 41. Fuse storage space 40 communicates with a region outside of housing 20 via opening 22. Additionally, openings 23, 24 and 25 are formed at surface 21 of housing 20. Openings 22, 23, 24 and 25 are covered with a cover member 30. In the state of use where PCU 1 is mounted on the vehicle, cover member 30 is fixed to housing 20 to seal the interior of housing 20. By removing cover member 30 from housing 20 at the stage of maintenance, maintenance service of PCU 1 can be carried out such as exchanging fuse 41 in fuse storage space 40.

An interlock switch 16 sensing an attached state is provided at cover member 30. Additionally, an interlock switch 17 is provided at the power cable input section towards PCU 1. Interlock switches 16 and 17 are turned OFF when cover member 30 is removed from housing 20, or when the power cable is cut to disconnect the system main relay.

A coolant device is provided for cooling PCU 1. A coolant inlet 18 for supplying coolant into the coolant device and a coolant outlet 19 for discharge from the coolant device are provided at housing 20. By employing a configuration in which IPM 12 for running and boosting is directly cooled by a cooling device to improve the heat dissipation during the operation of IPM 12, PCU 1 is rendered compact.

Figure 2:
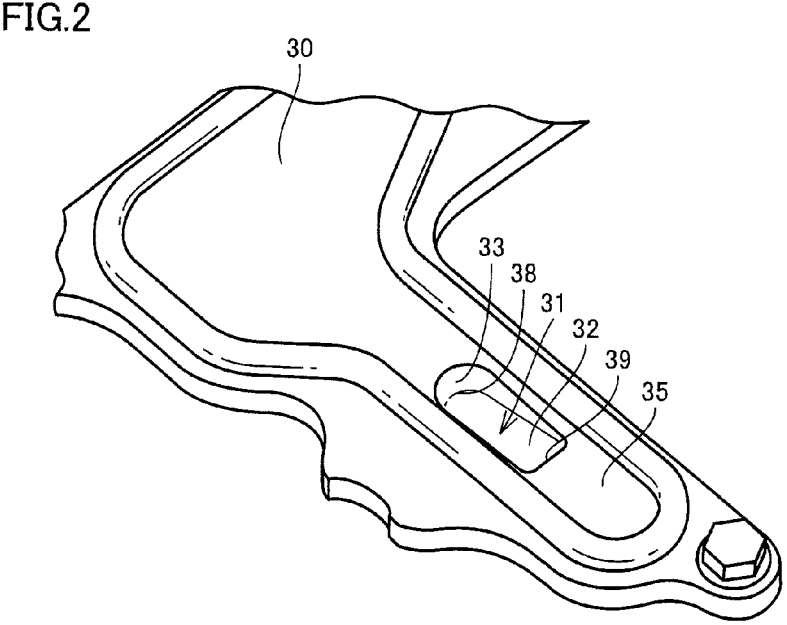
FIG. 2 is a perspective view showing in enlargement a portion of the cover member shown in FIG. 1.
Figure 3:
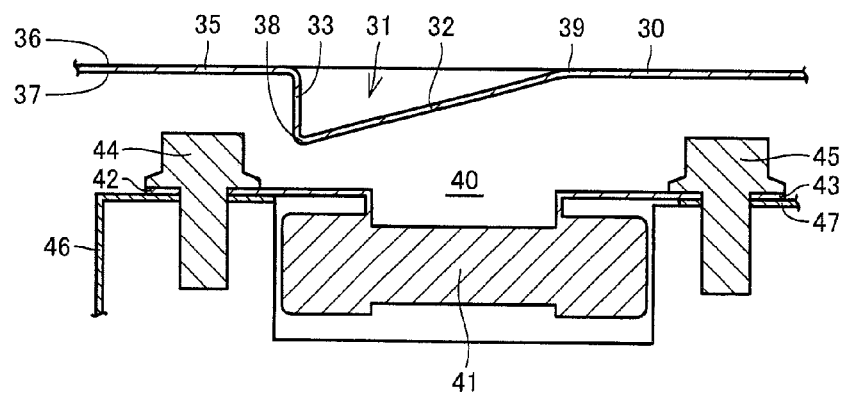
FIG. 3 is a sectional view representing a state where the cover member covers the fuse storage space.

FIG. 2 is a perspective view showing in enlargement a portion of cover member 30 of FIG. 1. FIG. 3 is a sectional view representing a state where cover member 30 covers fuse storage space 40. Under the state shown in FIG. 3, cover member 30 is fixed to a surface 21 of housing 20, closing opening 22 (refer to FIG. 1) formed at surface 21 of housing 20. Therefore, in the state shown in FIG. 3, fuse storage space 40 and the region outside of housing 20 are partitioned by cover member 30, attaining a state not communicating with each other.

As shown in FIGS. 2 and 3, cover member 30 includes a cover body 35, and a projection section 31 constituted of a portion of cover member 30 protruding inwards of fuse storage space 40 relative to cover body 35. Cover body 35 is formed plate-like. Plate-like cover body 35 includes an outer face 36 located at the side corresponding to the outer space of housing 20, and an inner face 37 facing fuse storage space 40. Projection section 31 is formed denting in the direction from the side of outer face 36 towards the side of inner face 37 of plate-like cover body 35.

As described with reference to FIG. 1, PCU 1 includes devices such as an inverter generating an electromagnetic wave in housing 20. In order to prevent the electromagnetic wave generated at the relevant device from leaking outside, an electromagnetic wave shield room surrounding the devices with a conductive plate member must be formed to block the propagation of electromagnetic waves. In the case where cover member 30 is a resin molding, opening 22 provided at housing 20 will correspond to a through hole for electrical conduction, causing the electromagnetic wave to leak outside through the through hole. Therefore, to suppress outward leakage of the electromagnetic wave from the interior of housing 20, cover body 35 and projection section 31 constituting cover member 30 are formed as a unitary molding made of metal.

Cover body 35 and projection section 31 can be formed integrally by applying an arbitrary plastic forming process such as press-working to a steel plate. By preparing a mold having a shape corresponding to cover member 30 with projection section 31, and apply press-working using that mold, high quality can be achieved since cover member 30 can be formed in high accuracy. Furthermore, since an additional material for forming cover member 30 with projection section 31, as well as an additional processing step such as welding, is not required, projection section 31 can be formed without increase in the fabrication cost. As a result of depressing outer face 36 of the steel plate by press-working to form projection section 31, projection section 31 is formed to have a shape denting in the direction from the side of outer face 36 towards the side of inner face 37 of cover body 35, when viewed from the side of outer face 36 of cover body 35.

Projection section 31 includes a dent bottom 32 constituting a bottom face in a shape denting in the direction from the side of outer face 36 towards the side of inner face 37 of cover body 35, and a side face 33 constituting an inner wall of the dent shape. Side face 33 is formed extending in a direction substantially orthogonal to plate-like cover body 35. Dent bottom 32 joins cover body 35 at a boundary 39, and joins side face 33 at a boundary 38. The perimeter of dent bottom 32 is constituted of boundary 38 and boundary 39.

As shown in FIG. 2, boundary 39 extending linearly constitutes the boundary between cover body 35 and dent bottom 32, whereas boundary 38 extending in a C-shape constitutes the boundary between side face 33 and dent bottom 32. Dent bottom 32 has a portion of the perimeter directly connected with cover body 35 at boundary 39, whereas the remaining portion of the perimeter is connected with side face 33 at boundary 38. Boundary 38 is provided at the end corresponding to the side of side face 33 away from cover body 35. As a result, dent bottom 32 is arranged inclining at a predetermined angle relative to the plane direction of cover body 35.

Referring to FIG. 3, a fuse 41 that is blown out when a current greater than a tolerable value flows is located in fuse storage space 40 as an example of the space formed in housing 20. Fuse 41 is an overcurrent-protection element that cuts off the current by having a fusible element made of metal with a low melting point burned out when excessive current flows.

Fuse 41 includes two junctions 42 and 43 extending outwards from the body. By the contact between a terminal 46 and junction 42 arranged in proximity to fuse 41 and the fixture through an attachment bolt 44, fuse 41 and terminal 46 are electrically connected. By the contact between a terminal 47 and junction 43 arranged in proximity to fuse 41 and the fixture through an attachment bolt 45, fuse 41 and terminal 47 are electrically connected. Terminals 46 and 47 constitute a portion of an electric circuit connected to the inverter, for example. By the fixture of junctions 42 and 43 by means of attachment bolts 44 and 45, fuse 41 is secured in fuse storage space 40.

The exchanging step of fuse 41 at PCU 1 having the structure set forth above will be described. In order to restart PCU 1 in the event of fuse 41 being burned off, the burned fuse 41 must be replaced with a new fuse 41. In this case, cover member 30 is removed from housing 20 to expose fuse storage space 40, and then attachment bolts 44 and 45 are loosened to cancel the fixture of fuse 41. Burned fuse 41 is removed from fuse storage space 40. Then, junctions 42 and 43 of new fuse 41 are fixed by attachment bolts 44 and 45, whereby new fuse 41 is attached in fuse storage space 40. Lastly, cover member 30 is closed and attached to housing 20. Thus, the exchanging step of fuse 41 is implemented.

Attachment of fuse 41 in fuse storage space 40 is implemented by screwing using attachment bolts 44 and 45. At this stage, there may be the case where new fuse 41 is arranged by attachment bolts 44 and 45 erroneously in an opposite posture in fuse storage space 40, so that new fuse 41 is attached upside down.

In the present embodiment, cover member 30 has a projection section 31 protruding inward of fuse storage space 40. If cover member 30 is to be attached to housing 20 when fuse 41 is erroneously assembled in fuse storage space 40, cover member 30 cannot be closed since projection section 31 interferes with a fuse 41. Therefore, the worker carrying out the exchanging job of fuse 41 can reliably confirm that fuse 41 has been erroneously assembled, allowing fuse 41 to be reattached properly. Therefore, the inconvenience of fuse 41 being attached in an opposite posture to cause short-circuiting between cover member 30 and fuse 41 can be prevented reliably.

Figure 4:
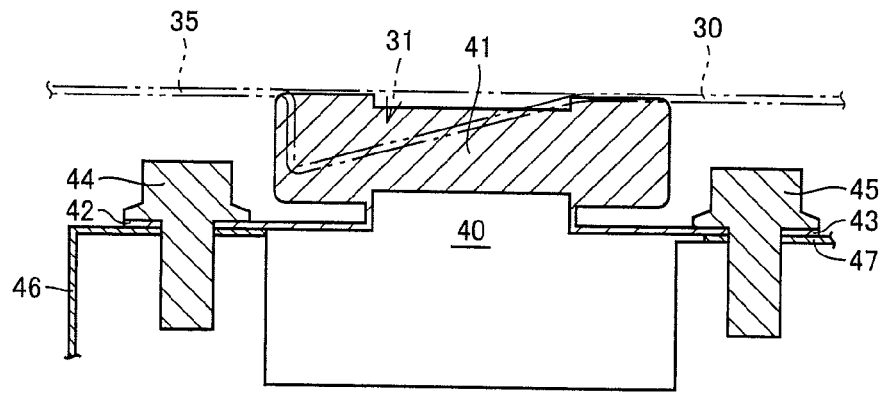
FIG. 4 is a sectional view representing a state where the fuse is attached in an upside down manner.

FIG. 4 is a sectional view representing a state where fuse 41 is attached upside down. Upon comparing FIGS. 3 and 4, the main body of fuse 41 is located at the lower side relative to junctions 42 and 43, remote from cover member 30, in FIG. 3 where fuse 41 is attached properly. In contrast, in FIG. 4 where the fuse is attached erroneously, the main body of fuse 41 is located at the upper side relative to junctions 42 and 43, in proximity to cover member 30. As mentioned above, cover member 30 of FIG. 3 corresponds to the state fixed to surface 21 of housing 20. Cover member 30 indicated by a dashed double-dotted line in FIG. 4 corresponds to the state representing the arrangement of cover member 30 corresponding to the case fixed to surface 21 of housing 20, likewise with that shown in FIG. 3.

If cover member 30 is attached in a normal manner to housing 20 under the state where fuse 41 shown in FIG. 4 is erroneously attached in fuse storage space 40, projection section 31 will interfere with fuse 41, as indicated by the dashed double-dotted line in FIG. 4. In practice, cover member 30 cannot be attached to housing 20. Therefore, when fuse 41 is erroneously attached in an exchanging job of fuse 41, the worker can reliably confirm the erroneous attachment to allow correction. Therefore, attachment of fuse 41 in an upside down manner can be prevented reliably.

Figure 5:
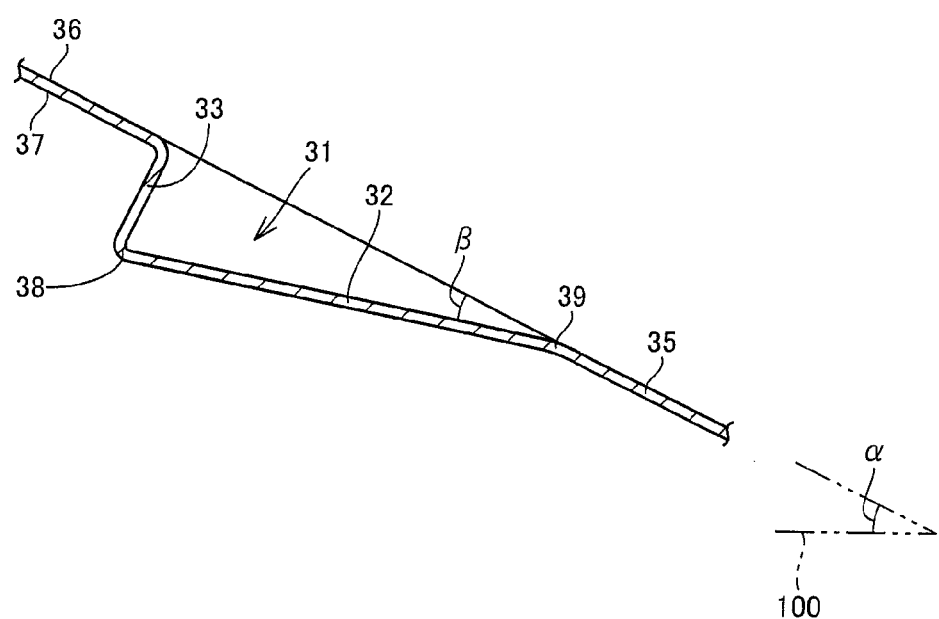
FIG. 5 is a sectional view representing a state where the cover member is arranged in an inclined manner to the horizontal plane.

The relationship between the arrangement of PCU 1 and the configuration of projection section 31 will be described hereinafter. FIG. 5 is a sectional view representing a state where cover member 30 is arranged having an inclination relative to the horizontal plane. In the state shown in FIG. 5, housing 20 is arranged such that surface 21 thereof has an inclination of a first angle $\alpha$ with respect to horizontal plane 100. Therefore, cover member 30 attached to surface 21 of housing 20 has plate-like cover body 35 inclined at an angle $\alpha$ with respect to horizontal plane 100. Cover body 35 in the plane direction forms an angle $\alpha$ relative to horizontal plane 100.

Cover member 30 having cover body 35 arranged in an inclined manner to horizontal plane 100 is arranged such that dent bottom 32 of projection section 31 joins cover body 35 at the lower side of the inclination of housing 20. Dent bottom 32 constitutes a bottom face of a denting configuration in the direction from the side of outer face 36 towards the side of inner face 37 of plate-like cover body 35. Cover member 30 is arranged such that boundary 39 corresponding to the joining position between dent bottom 32 and cover body 35, along the perimeter of dent bottom 32, is located at the downmost side of the inclination of cover body 35.

Dent bottom 32 shown in FIG. 5 is formed plate-like. As used herein, the plane direction of dent bottom 32 formed in plate shape and the plane direction of plate-like cover body 35 constitute a second angle $\beta$. Dent bottom 32 has an inclination of an angle $\beta$ relative to cover body 35. As shown in FIG. 5, cover body 35 and dent bottom 32 cross each other, forming an angle $\beta$ at boundary 39.

Upon comparing angle $\alpha$ corresponding to surface 21 of housing 20 inclined with respect to the horizontal plane and angle $\beta$ of dent bottom 32 inclined with respect to cover body 35, angle $\beta$ is smaller than angle $\alpha$. For example, when PCU 1 is mounted on the vehicle to have an inclination of an angle 18° relative to horizontal plane 100, cover member 30 is formed such that the inclining angle of dent bottom 32 relative to cover body 35 is less than 18°. Therefore, as shown in FIG. 5, boundary 39 corresponding to the joining position between dent bottom 32 and cover body 35 is located more downwards than boundary 38 corresponding to the joining position between dent bottom 32 and side face 33 in the vertical direction perpendicular to horizontal plane 100.

Figure 6:
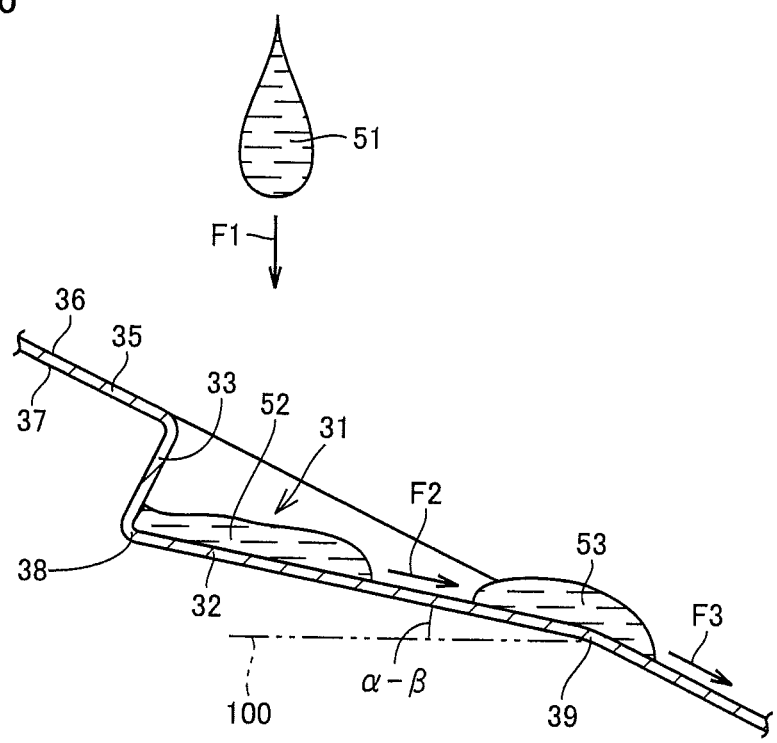
FIG. 6 is a sectional view representing an example in which droplets enter the projection section of the cover member shown in FIG. 5.

FIG. 6 is a sectional view representing an example in which droplets enter the projection section of the cover member shown in FIG. 5. By arranging cover member 30 as described with reference to FIG. 5, and forming projection section 31 according to the shape shown in FIG. 5, dent bottom 32 has a positive angle ($\alpha-\beta$) relative to horizontal plane 100. Dent bottom 32 is inclined relative to horizontal plane 100, forming an angle ($\alpha-\beta$). Boundary 38 is located at the upper side of the inclination of dent bottom 32, and boundary 39 is located at the lower side of the inclination of dent bottom 32. Cover member 30 is arranged such that boundary 39 where dent bottom 32 is directly joined with cover body 35 is located at the downmost side of the inclination of dent bottom 32 arranged in an inclined manner relative to horizontal plane 100.

Consider the case where a droplet 51 falls as shown by arrow F1 on outer face 36 of cover member 30 arranged as set forth above to enter a dent that is a portion of outer face 36 of cover member 30 being dented. Even in such a case, droplet 52 entering the dent flows downward running along dent bottom 32 inclined relative to horizontal plane 100, as shown by arrow F2, to be discharged from the dent across boundary 39. Droplet 53 flowing outside the dent runs, as shown by arrow F3, along cover body 35 having a greater inclination relative to horizontal plane 100. In other words, droplet 52 entering the dent is discharged by itself from the dent through the action of gravity, so that droplet 52 will not remain for a long period of time in the dent.

If liquid having corrosivity such as salt water remains in contact with a specific site of cover member 30 made of a steel plate for a long period of time, the specific site will be corroded to cause a hole to be formed at cover member 30. This is not desirable since there is a possibility of corrosive liquid entering the interior of housing 20 of PCU 1 through such a hole. Cover member 30 of the present embodiment can have corrosive liquid promptly discharged from the dent formed at the outer face of cover body 35, as described above. Therefore, occurrence of corrosion at cover member 30 can be suppressed. Thus, a cover member 30 of longer lifetime and high reliability can be provided.

Dent bottom 32 shown in FIGS. 5 and 6 has, but is not limited to, a plate-like shape of the present embodiment. For example, dent bottom 32 may have a shape in which a plurality of flat plates inflexed with respect to each other are assembled, or may have a curved shape such as a paraboloid.

In this case, dent bottom 32 is formed such that the angle between dent bottom 32 and cover body 35 is small at the upper side of the inclination of inclined cover body 35 and becomes larger in incremental steps at the lower side of the inclination. In the case where dent bottom 32 is to have a curved shape, dent bottom 32 is to be formed such that the angle between the tangent plane of dent bottom 32 and cover body 35 is monotonically increased as dent bottom 32 approaches boundary 39. Furthermore, the maximum angle formed between dent bottom 32 and cover body 35 is set smaller than angle α of cover body 35 inclined relative to horizontal plane 100. Accordingly, a configuration in which the corrosive liquid flows out by itself from the dent can be provided, preventing the corrosive liquid from remaining in the dent.

It should be understood that the embodiments of the present invention disclosed herein are illustrative and non-restrictive in every respect. The scope of the present invention is defined by the terms of the claims, rather than the description of the embodiments set forth above, and is intended to include any modifications within the scope and meaning equivalent to the terms of the claims.

REFERENCE SIGNS LIST

1 PCU; 20 housing; 21 surface; 22 opening; 30 cover member; 31 projection section; 32 dent bottom; 33 side face; 35 cover body; 36 outer face; 37 inner face; 38, 39 boundary; 40 fuse storage space; 41 fuse; 42, 43 junction; 44, 45 attachment bolt; 46, 47 terminal; 51, 52, 53 droplet; 100 horizontal plane

The invention claimed is:

1. An electrical apparatus comprising:
a housing having a surface, a space being formed in said housing, said space communicating with a region outside of said housing through an opening formed at said surface;
an overcurrent-protection fuse located in said space; and
a cover member made of metal, covering said opening,
wherein said cover member includes a cover body and a projection section, the cover body being a part of a top surface of the cover member,
wherein the cover member forms a gap between said top surface of the cover member and a body of said fuse, and
wherein the projection section protrudes:
inward and away from said top surface of the cover member and
into said gap and towards the body of said fuse, and
when said fuse is attached properly in said space, an insulation distance between said cover member and said fuse is ensured, and when said fuse is erroneously attached in said space, said projection section mechanically interferes with the body of said fuse to disallow attachment of said cover member to said housing.

2. The electrical apparatus according to claim 1, wherein said cover body and said projection section are a unitary molding made of metal.

3. The electrical apparatus according to claim 2, wherein said cover body is formed plate-like, and
said projection section is formed denting in a direction from a side of an outer face towards a side of an inner face of said cover body.

4. The electrical apparatus according to claim 3, wherein said housing is arranged such that said surface has an inclination of a first angle relative to a horizontal plane,
said projection section has a dent bottom constituting a bottom face in a shape denting in the direction from the side of said outer face towards the side of said inner face of said cover body,
said dent bottom joins said cover body at a lower side of the inclination of said housing, and is inclined having a second angle relative to said cover body, and
said second angle is smaller than said first angle.

* * * * *